United States Patent

[11] 3,614,400

[72] Inventors Edward Charles Farnett Cinnaminson; Lee Oliver Upton, Jr., Edgewater Park, both of N.J.

[21] Appl. No. 880,028
[22] Filed Nov. 26, 1969
[45] Patented Oct. 19, 1971
[73] Assignee RCA Corporation

[54] MAXIMUM LENGTH PULSE SEQUENCE GENERATORS
2 Claims, 5 Drawing Figs.

[52] U.S. Cl. .......... 235/152, 340/146.1, 340/348
[51] Int. Cl. .......... G06f 1/02
[50] Field of Search .......... 235/152, 153; 340/146.1, 348; 331/78

[56] References Cited

UNITED STATES PATENTS

| | | | |
|---|---|---|---|
| 3,119,097 | 1/1964 | Tullos | 340/146.1 X |
| 3,155,818 | 11/1964 | Goetz | 340/146.1 X |
| 3,159,810 | 12/1964 | Fire | 340/146.1 |
| 3,162,837 | 12/1964 | Meggitt | 340/146.1 |

OTHER REFERENCES

Chow and Davies, " The Synthesis of Cyclic Code Generators," Electronic Engineering, April 1964, pp. 253– 259.

W. W. Peterson Error Correcting Codes, MIT Press and John Wiley & Sons, 1961, pp. 147, 148.

*Primary Examiner*—Charles E. Atkinson
*Attorney*—H. Christoffersen

ABSTRACT: An $n$ stage shift register can be operated as a digital pulse sequence generator by feeding back to the first stage the modulo 2 sum of the signals produced by at least two stages of the register. By properly selecting the stages from which the modulo 2 sum feedback signal is derived, the register can be made to produce a pseudo random sequence of $2^n-1$ digits (the maximum length sequence possible for $n$ stages). This application relates to a machine implemented process for calculating from a specific feedback connection producing a maximum length sequence all other feedback connections that will produce a maximum length sequence.

INVENTORS
*Edward C. Farnett*
*and Lee O. Upton, Jr.*
BY H. Christoffersen
ATTORNEY INVENTORS
Edward C. Farnett
and Lee O. Upton, Jr.
BY H. Christoffersen
ATTORNEY INVENTORS
Edward C. Farnett
and Lee O. Upton, Jr.
BY H. Christoffersen
ATTORNEY

MAXIMUM LENGTH PULSE SEQUENCE GENERATORS

BACKGROUND OF THE INVENTION

The invention described in this application was made in the course of a contract with the Department of the Navy.

Pseudorandom sequences of digital pulses are useful in communications and radar. For example, modulating the output of a radar with such a sequence of pulses improves target resolution without increasing power output. Target resolution (the ability to separate targets) is determined by the width of the individual pulses, whereas the power output is determined by the total duration of the pulse widths transmitted.

A pulse sequence is a serially occurring train of pulses having a pseudorandom nature in that the time between pulses varies in an almost random way. The pulse sequence can be represented by a series of 1's and 0's, where the digit 1 indicates a pulse at the time interval represented by the position of the digit and a zero indicates the absence of a pulse.

One of the simplest circuits for generating a pulse sequence uses a number of shift register stages connected serially so that the output of each stage is the input for the following stage and the output of the last stage is the input for the first. The number of stages required is the total number of digits (1's and 0's) in the pulse sequence. The stages are preset to represent the sequence desired and the shift register is shifted continuously. The output sequence can be taken from the output of any stage. This method is limited by space and cost consideration as the number of pulses in the sequence increases.

A modification of the simple shift register generator permits a sequence length of $2^n-1$ pulses using only $n$ stages, the sequence of all zeroes being excluded. For example, a 20-stage shift register properly connected can repeat a given sequence of more than one million pulses.

The shift register is modified by disconnecting the output of the last stage from the input of the first and providing an input value of 1 to the first stage if an odd number of certain selected stages are storing a value of 1. The output pulse sequence is taken from the output of the last stage.

The output of the certain selected stages (feedback taps) are used as inputs to a modulo-2 adder, the output of which is the input to the first stage. The output of the last stage must always provide an input to the modulo-2 adder; otherwise, the effect is to shorten the length of the register.

Only certain feedback tap combinations will produce a pulse sequence of maximum length. Other combinations will produce shorter sequences. Because the last stage must always be used as a feedback tap, there is a total of $2^{n-1}$ different possible combinations of feedback taps.

At least one combination of feedbacks is known in the art for $n$ stages up to $n=100$ that will produce a maximum length sequence. Other maximum length combinations can be derived by trial and error methods from a known combination.

One such method is based on the fact that taking every $k$-th pulse produces a different sequence, where $k$ is an odd number that is prime to $2^n-1$. Some of the $2^{n-1}$ combinations can be eliminated and the remaining combinations are tested to find one that will produce a maximum length sequence.

It is an object of this invention to describe a method whereby all possible combinations of feedback taps producing a maximum length sequence can be directly determined, given one such combination.

BRIEF DESCRIPTION OF THE INVENTION

A machine implemented method is described for selecting which stages of an $n$ stage shift register generator, in addition to the last stage, should be summed modulo-2 to produce a feedback signal to the first stage of the shift register so that the output of the last stage will be a pulse sequence of maximum length ($2^n-1$ bits) if one such feedback combination is known.

The first step is the derivation of a characteristic equation, a polynomial of degree $n-1$, the variable of which is the response matrix of the known combination. The coefficients are one or zero depending on whether the stage represented by the exponent of the variable is summed or not; the zero power of the variable is an identity matrix and has a coefficient of one.

The next step is the generation of a first matrix having $n$ columns and $2^n-1$ rows. The columns represent the exponents of a polynomial of degree $n-1$, and the rows represent successive powers of the response matrix of the known combination. The elements of the first matrix are one or zero depending on whether the powers of the variable corresponding to the column number, are summed or not to equal the power of the variable corresponding to the row number. If the $n$-th power appears, it is replaced by the characteristic equation.

Next, a second matrix is generated having $n$ rows and $n-1$ columns. The successive rows of the second matrix are every $k$ mod $(2^n-1)$-th row of the first matrix with the column corresponding to the zero power of the variable eliminated.

The second matrix is then reduced by adding columns together so that each row exept the last has only one element with a value of one and each such element in each row is in a different column. The last step is the selection as a feedback stage, in addition to the last stage, those stages corresponding to a row number having an element with a vlaue of one in a column in which the last row has an element with a value of one.

DETAILED DESCRIPTION OF THE INVENTION

Figure 1:
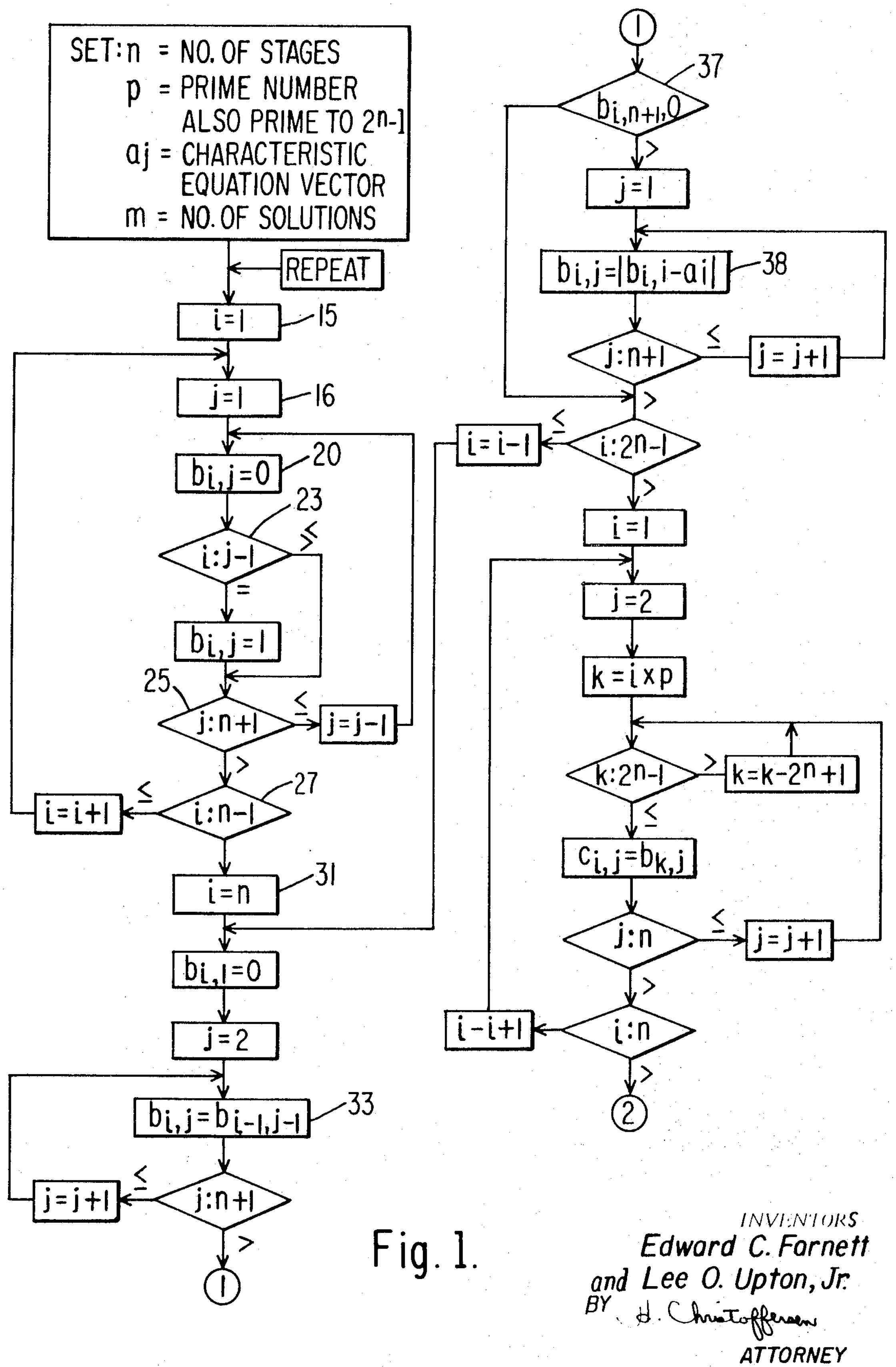
FIG. 1 is a flow chart of the steps to be followed in the execution of the first part of a program which is the preferred embodiment of the invention.

The method of the invention uses Boolean matrices which are manipulated by modulo-2 operations. A Boolean matrix is a matrix in which the elements are zero or one. Boolean matrices can be manipulated using the logical operators AND, OR and NOT. Modulo-2 addition is an EXCLUSIVE OR function. That is, $(a+b) \bmod 2 = a \oplus b = a\bar{b} + \bar{a}b$. The same result can be reached using conventional arithmetic by $$a \oplus b = |a-b|.$$

The right-hand member of the equation above has the value of 1 if, and only if, $a$ or $b$ has a value of 1, but not both.

Addition (mod-2) of Boolean matrices is possible only when the matrices have the same number of rows and the same number of columns. The usual convention of denoting a matrix by an upper case letter, e.g., A, and its elements by a subscripted lower case letter, e.g., $a_{i,j}$, will be followed in this description. The subscripts $i$ and $j$ denote the row and column numbers, respectively. Therefore, $A \oplus B = a_{i,j} \oplus b_{i,j}$ for $i = 1,2,\ldots, m$ and $j = 1,2,3,\ldots,n$.

A property of modulo-2 matrix addition is $$A \oplus A = 0.$$

Also, the values of matrices are unchanged when columns are added to columns or rows are added to rows.

Multiplication (mod-2 ) of Boolean matrices is similar to the usual method of multiplying matrices, the summation of products for each element being modulo-2. The number of columns in the first matrix must be equal the number of rows in the second, and the number of rows in the first must equal the number of columns in the second. The elements of the product matrix C that result from $A \otimes B$ are $$c_{i,j} = \bigoplus\!\!\sum_{k=1}^{m} a_{i,k} \times b_{k,j}$$

In the method taught by this invention, a vector is used which is a matrix having $m$ column and row one.

The first step in practicing this invention is the derivation of a characteristic equation vector from the known feedback combination. For a shift register generator having $n$ stages, the characteristic equation vector has $n+1$ columns. The first and last columns have a value of 1. The second column of the vector corresponds to the first stage of the shift register, the third column corresponds to the second stage of the shift register, and so on up to the $n+1$ column corresponding to the $n$ stage of the shift register. If the output of a stage is used as an input to the feedback network in the known shift register generator, a value of 1 is inserted in the characteristic equation vector column corresponding to that stage. If the output of a stage is not summed, the value of the element in the corresponding column is 0.

The characteristic equation vector is a function of the sum of matrices derived from the known feedback combination. The known shift register generator can be used to derive A matrix. The rows of the A matrix correspond to the inputs of each stage and the columns, to the outputs. If the $j$-th stage's output signal is the input signal for the $i$-th stage, $a_{i,j}$ is given the value of 1. Otherwise, it is given a vlaue of 0. Such a matrix is called a response matrix.

If various powers of A are taken, i.e., $A^2$ (which is $A \otimes A$), $A^3$, and so on, it will be found that the $n$-th power is equal to the sum of the powers corresponding to the feedback stages plus the identity matrix, $A^0$. The identity matrix has the elements $$a_{i,j}=\begin{cases}0 \text{ when } i\neq j\\ 1 \text{ when } i=j\end{cases}$$

In other words, the elements of the main diagonal (upper left to lower right) have a value of 1 and the rest, 0.

The first column of the characteristic equation vector corresponds to the $A^0$ matrix; column 2, to $A^1$; and so on.

As an illustration, if, in a 15 stage shift register generator, feedback taps are taken from stages 3, 8, 12, and 15, the characteristic equation is $$A^{15}=A^{12} \oplus A^8 \oplus A^3 \oplus A^0$$ and the characteristic equation vector is 100100001000100 1.

It should be noted that the vector is used for programming purposes and has no significance, per se.

A B mitrix is constructed based on the characteristic equation vector and powers of the A matrix. The B matrix in the described embodiment has $n+1$ columns and $2^n-1$ rows. The B matrix can be considered as having an infinite number of rows in which every group of $2^n-1$ rows are repeated. It is, therefore, necessary to calculate only the first $2^n-1$ rows. The elements $b_{i,j}$ in the first $n$ rows of the B matrix are 0 except in the columns where $=j-1$ which are given a value of 1. Each of the remaining rows of the B matrix is derived from its preceding row by shifting each column one column to the right and setting the value of the element in the first column to 0. If the element in the $n+1$ column of a row has a value of 1, the characteristic equation vector is added (mod-2) to that row.

The B matrix elements are defined as foloows. The row number $i$, of the B matrix corresponds to the $i$-th power of the A matrix. The column numbers of the B matrix correspond to the powers of the A matrix (including the zero power), the summation of which equal the power denoted by the row number.

For example, in the first row of the B matrix, which corresponds to the A ($A^1$) matrix, $b_{1,2}=1$ and the other elements are 0 because $A^1$ is a function of $A^1$ only. Similarly, in row 2, $b_{2,3}=1$ and the other elements are 0. In the $n$-th row, $b_{n,n+1}=1$.

The rule stated above requires that the characteristic equation vector be added to that row. In effect, this substitutes the summation representing the characteristic equation of $A^n$.

In the example above, where $n=15$, the 15th row of the B matrix would be

0000000000000001.

After adding (mod 2) the characteristic equation vector 1001000010001001, the 15th row would be 1001000010001000. That is, $A^{12} \oplus A^8 \oplus A^3 \oplus A^0$ is substituted for $A^{15}$.

The 16th row would be 0100100001000100.

The 18th row would be 0001001000010001. This represents $$A^{18}=A^{15} \oplus A^{11} \oplus A^6 \oplus A^3.$$

The element in the $n+1$ column has the value of 1 so the characteristic equation vector is added to give 1000001010011000 as the 18th row. This in effect substitutes the characteristic equation for $A^{15}$ so that $$A^{18}=(A^{12} \oplus A^8 \oplus A^3 \oplus A^0) \oplus A^{11} \oplus A^6 \oplus A^3.$$

As stated above, $A^3 \oplus A^3=0$ so that row 18 represents $$A^{18}=A^{12} \oplus A^{11} \oplus A^8 \oplus A^6 \oplus A^0.$$

The 19th row represents $A^{19}=A^{13} \oplus A^{12} \oplus A^9 \oplus A^7 \oplus A^1$. That is, each power is increased by multiplication by $A$. Therefore, the 19th row is 0100000101001100.

This process of generating rows is continued through row $2^n-1$, which completes the B martix.

A C matrix is then derived from the B matrix by selecting as each row of the C matrix every $k$-th row of the B matrix, where $k$ is a prime number other than 2 and is also prime to $2^n-1$. The C matrix has $n$ rows and $n-1$ columns; the first and last columns of the B matrix rows are dropped when deriving the C matrix.

The C matrix is then reduced by adding columns so that each row of the C matrix except the last has a single element with a value of 1, each in a different column.

A straightforward method of reducing the C martix is to add (mod-2) the first column having an element with a value of 1 in the first row to all other columns having a value of 1 in the first row. All the elements in the first row will then have a value of 0 except that in the column which was added to the others.

Next, the first column having an element with a value of 1 in the second row and a value of 0 in the first row is added to all other columns having an element with a value of 1 in the second row. This process is repeated for each row in succession except the last. The new solution uses as feedback stages those stages corresponding to row numbers having an element with a value of 1 in a column in which the last row has an element with a value of 1.

Another solution can be found by repeating the steps described above using a characteristic equation vector derived from the solution just obtained and using the same value of $k$. When the original solution is repeated, all the possible combinations of feedback taps producing a maximum length pulse sequence have been found.

FIG. 1 shows a flow chart for the first part of a program for performing the method of the invention. The first step as shown in the block 10 sets up the initial parameters of the problem. The value of $n$ is stored to indicate the number of stages, $p$ is selected from the prime numbers (except 2l) which are also prime to $2^n-1$, the characteristic equation vector, $a_j$, is determined by the known solution, and the number of solutions is denoted by $m$.

The next step as shown in the block 15 sets an indexing variable $i$ to the value of 1 and the second step as shwon in the block 16 sets another indexing variable $j$ to the value of 1.

During the running of the program, the variables may be addressed using any one of several conventions. In this embodiment, the values of $b$ are stored in a sector of the memory in serial fashion so that the first subscript varies faster than the second. For example, $b_{1,1}$ is the first element stored in the assigned sector and is followed in succession by $b_{2,1}$, $b_{3,1}$, and so on. Referencing a particular element, denoted by the subscripts $i$ and $j$, causes the computer to calculate an address based on the values of $i$ and $j$. If L is the memory address of the location preceding that of the element $b_{1,1}$, the memory address of $b_{i,j}$ is found by $L+i+r(j-1)$, where $r$ is the number of rows. For purpose of clarity, this step has not been shown, but it is implied by denoting a subscripted variable.

Next, each element in the first $n-1$ rows of the B matrix is set to 0 as is shown in the block 20 in FIG. 1.

A decision point in the program, indicated by a diamond shape, is shown by the block 23. It indicates that the value of $i$ is compared to the value of $j-1$. If the values are equal, the program takes the branch indicated by the arrow emerging from the bottom of the block and labelled with an = sign. If $i$ is greater or less than $j-1$, the program branches to the other path.

In FIG. 1, if the value of $i$ is equal to $j-1$, then the element $b_{i,j}$ is given the value of 1. If $i$ is not equal to $j-1$, $b_{i,j}$ remains 0 by skipping the $b_{i,j}=1$ step.

Next, it is determined whether the value of $j$ exceeds the quantity $n+1$. If it does not, $j$ is replaced by the value of $j+1$ and the program returns to the step indicated by the block 20. The steps are repeated as described above. When the value of $j$ is greater than the quantity $n+1$, the value of $i$ is examined as is shown in the block 27 to determine whether it is greater than the quantity $n-1$. If it is not, $i$ is replaced by the value of $i+1$ and the steps of the program are repeated starting at the point where the indexing variable $j$ is set to a value of 1 as is shown in the block 16. The program continues in this manner until the value of $i$ exceeds the quantity $n-1$.

The effect of manipulating the values of the indexing variables $i$ and $j$ as shown in the flow chart of FIG. 1 from the block 15 to the block 27 is that $i$ and $j$ are stepped through all the $(n-1)$ $(n+1)$ combinations. That is to say, the elements of each successive row of the matrix are addressed by incrementing the value of $i$ by 1 and each successive column of each successive row is addressed by incrementing the value of $j$ and 1. Each time a new row is designated by incrementing the value of $i$, the value of $j$ is initialized to the value of 1 and incremented through its range before the value of $i$ is again incremented by 1. Therefore, all the elements in the $n+1$ columns of the first $n-1$ rows (i.e., $n^2-1$ elements) are set to 0 except for those in which the value of $i$ is equal to $j-1$.

Next, the value of the indexing variable $i$ is set to the quantity $n$ as is shown in the block 31. The first element of the $n$-th row is set to 0. The index variable $j$ is set to the value of 2 and each element of the $n$-th row is then set to the value of the element in the preceding column of the preceding row. This is shown in the block 33 by subtracting 1 from each of the indicies on the right-hand side of the equation.

This is done for each column of the $n$-th row as indicated by incrementing the indexing variable $j$ from a value of 2 to $n+1$.

The element in the last column ($b_{i,n+1}$) is then examined to determine whether it is equal to 0 as is shown in the block 37.

If the element is equal to 0, then the indexing variable $i$ is examined to see whether the last row ($2^n-1$) has been completed. If not, the value of $i$ is incremented by 1 and the next row is processed.

If the element is equal to 1, the characteristic equation vector is added to that row as is shown by the block 38, using the indexing variable $j$ to process all the columns.

The elements of the characteristic equation vector are denoted by $a_j$ where $j$ is the column number. The elements of the characteristic equation vector are added (mod-2) to the elements of the $i$-th row by taking the absolute value of their difference. The indexing variable $j$ is set to 1 and incremented through its range to the value $n+1$ so that each column of the $i$-th row is added (mod-2) in turn to the corresponding column of the characteristic equation vector.

The value of the indexing variable $i$ is checked to determine whether it exceeds the value of $2^n-1$. If not, its value is incremented by 1 and the next row is processed.

When the $(2^n-1)$th row has been processed, the B matrix is complete.

The C matrix is derived by taking every $k$-th row of the B matrix (excluding the first and last column) as successive rows in the C matrix. The indexing variables $i$ and $j$ are set to values of 1 and 2, respectively, and the value of $k$ is determined by multiplying the value of $i$, which now denotes the row of the C matrix being processed, by the value of $p$ which was set as an input parameter.

The value of $k$ is next compared to the value $2^n-1$. If $k$ is greater than $2^n-1$, the quantity $2^n-1$ is subtracted from $k$ and the comparison repeated. This permits the program to treat the B matrix as if it had an infinite number of rows by keeping the value of $k$ between 1 and $2^n-1$, inclusive, i.e., $k$ mod $(2^n-1)$, letting 0 mod $(2^n-1)=2^n-1$.

When $k$ is less than or equal to $2^n-1$, each element of the B martix in the $k$-th row from columns 2 through $n$ is transferred to the corresponding columns of the $i$-th row of the C matrix. (Columns 1 and $n+1$ of the C martix are ignored. Corresponding column numbers are used to simplify the program.)

When $i=n$, i.e., when the $n$-th row of the C matrix has been derived, the C matrix is complete.

Figure 2:
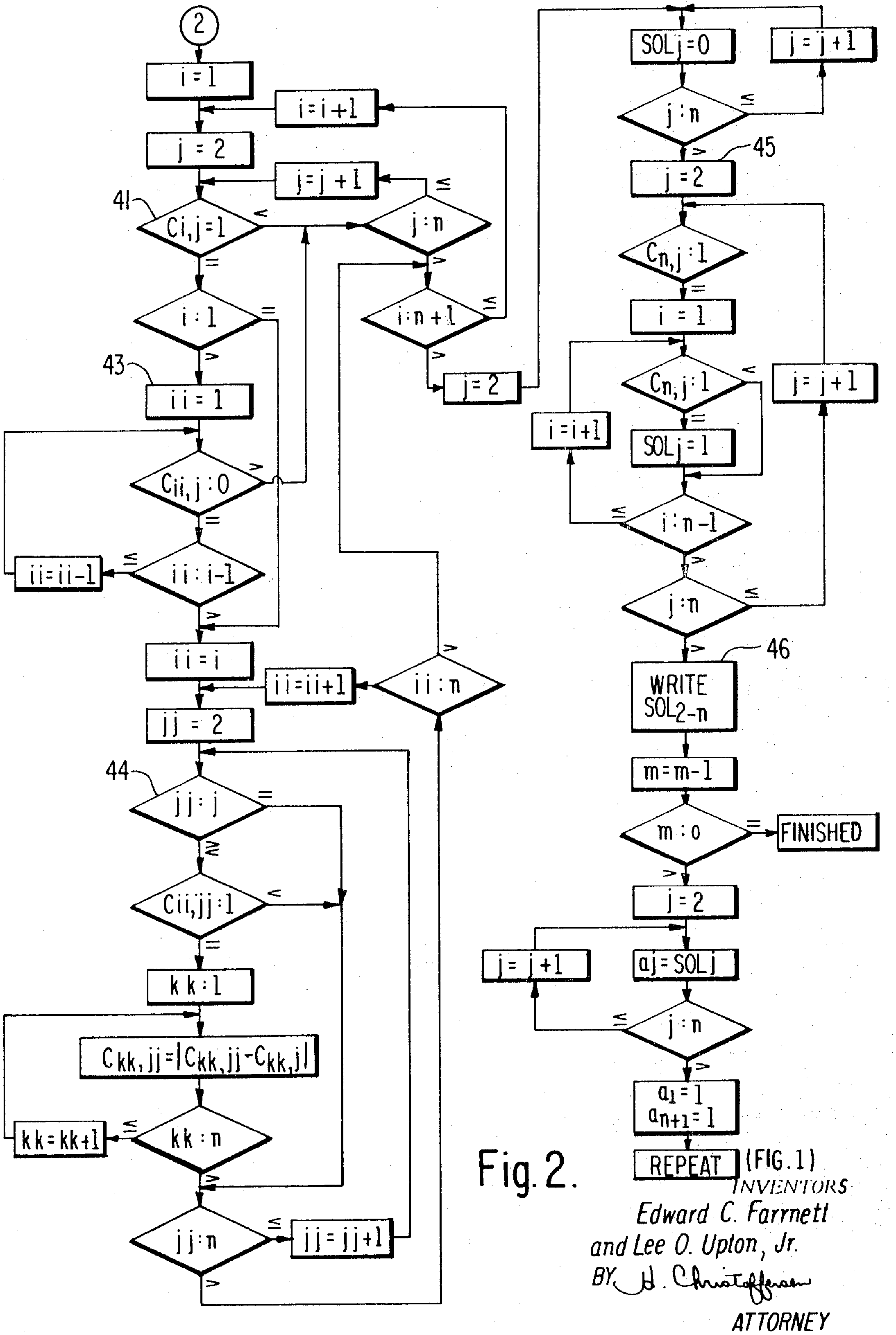
FIG. 2 is a flow chart of the second part of the program which is the preferred embodiment of the invention.

FIG. 2 shows the flow chart for the final part of the program. The indexing variables $i$ and $j$ are set to 1 and 2, respectively, and each element in the $i$-th row of the C matrix is compared to 1. In the first row, a column is located in which the element has the value of 1 and this column is then added to all other columns having an element with a value of 1 in the same row. In the following rows, an element with a value of 1 is located in a column which has all elements in all of the preceding rows equal to zero. This column is added to all other columns having an element with a value of 1 in the same row. This procedure is repeated for all except the last row. When every row except the last has one element having a value of 1 in a different column than the other rows, the matrix C is reduced.

The C matrix is reduced in the described embodiment of the invention in the following way. Each element of the $i$-th row starting with the first row is examined to see if it has the value of 1 as is shown in the block 41.

If $c_{i,j}=1$, a check is made to determine if the first row is being processed. The first row is a special case because the elements in the same column of the preceding rows are not checked. If the first row is not being processed, an indexing variable $ii$ is set to 1 as is shown in the block 43. Each element in the preceeding rows of the column is checked to determine whether it has a value of 0.

If a preceding row is found that does not have the value of 0, the value of $j$ is checked to determine whether all columns of the $i$-th row have been processed. If not, $j$ is incremented by 1 and the next column examined.

If all of the preceding rows have a value of zero, the indexing variables $ii$ and $jj$ are set to the values of $i$ and 2, respectively.

Using the indexing variables $ii$ and $jj$, the $j$-th column is added (mod-2) to all other columns having a 1 in the same row. The elements in the preceding rows (1 to $i-1$have been found to have a value of 0 so they need not be added.

It must be determined, however, during this addition process that the column which is being added to the other columns is not inadvertently added to itself. This is done by skipping the addition process when the indexing variable $jj$ is equal to $j$, the later representing the column being added to the other columns. This is performed as is shown in the block 44. The addition process is skipped when $jj=j$.

The element in the $ii$-th row and $jj$-th column is checked to determine if it has a value of 1. If not, the addition process is skipped. If $c_{ii,jj}=1$, then each element of the $j$-th column is added (mod-2) 2) to the element in the corresponding row of the $jj$-th column.

The indexing variable $kk$ is used as a row index to process all the elements of the columns involved.

When the addition has been completed for each row, the value of $i$ is checked to see whether it exceeds $n-1$. If it does not, $i$ is incremented by 1 and the entire process of reduction is repeated for the next row. The last row is not reduced.

When the value of $i$ exceeds the quantity $n-1$, the reduction process is complete.

In the embodiment shown, the solution is presented in vector form. An indexing variable $j$ is set to the quantity 2 and each column of the solution vector is set to 0.

The indexing variable $j$ is again set to a value of 2 as is shown in the block 45. Then, the element in each column of the C matrix in the last ($n$-th) row is examined to determine whether it has a value of 1. If it does not, the value of $j$ is incremented by 1 if it does not exceed the value of $n-1$, and the process is repeated.

When an element in a column of the last row of the C matrix has a value of 1, each row above it is examined to determine the number of the row in which the value of the element is equal to 1. This is done by setting the indexing variable $i$ to a value of 1 and examining the value of the element of each row.

When an element having a value of 1 is found in the $i$-th row, a value of 1 is inserted in the solution vector in the $i$-th column. This is continued until the value of the indexing variable $j$ exceeds the value of $n$.

The solution vector is then written as the solution as is shown in the block 46. Only the values of the columns 2 through $n$ are wirtten. The columns written correspond to each stage of the shift register generator except the last. The last stage is always used as a feedback tap. The solution vector indicates by 1 in the $j$-th column that a feedback tap is to be taken from the $j$-th stage of the shift register.

The value of $m$, which denotes the number of solutions, is decremented by 1 and checked to determine whether it is equal to 1. If $m$=0, the program is finished. If $m$ is greater than 0, the characteristic equation is replaced by the solution vector, the first and last columns being set with a value of 1, respectively. The program is then repeated beginning at block 15 on FIG. 1 to find another solution.

Instead of setting a value of $m$, the program could store the original characteristic equation vector and compare it to each subsequently derived characteristic equation vector. When they were equal, all the solutions would have been calculated. However, as the value of $n$ increases, the number of solutions increases. Therefore, it is preferable to set $m$ as the desired number of solutions.

The characteristic equation itself can be derived by the program. For example, instead of using the characteristic equation vector as an input parameter, the number of the stages from which feedback taps are taken in the known solution can be used as an input parameter. The program can generate the vector by setting all columns to 0 except the first and last which will be set to 1. Then the input (stage numbers) can be used as column indicies to set the vector element to a value of 1.

When the value of $n$ is large, the B matrix will have a large number of rows. For example, if $n$=20, the B matrix will have over a million rows. When $n$=100, the value of $2^n-1$ exceeds 1.25×10, which is a prohibitive number of rows to store.

There are techniques well known in the art for alleviating this problem. One is to use a single bit to store a matrix element value because such values are restricted to 1 and 0. However, for $n$=100, the memory requirements would still be prohibitive.

Another technique would be to store each row on magnetic tape as a block of information. The indexing variables would then be used to find the row being processed by any one of several ways. The simplest is to label each block with a number identifying the row the block represents. The tape can then be operated to read each block starting with the first until the block identification number matches the index variable indicating the number of the row being processed.

A better technique, based on the fact that only $n$ rows must be saved for the C matrix, would be to retain in memory or on tape only every $k$-th row. In effect, the C matrix would be developed as the rows of the B matrix were processed. This technique can be modified for the case where $k$ is varied.

Figure 3:
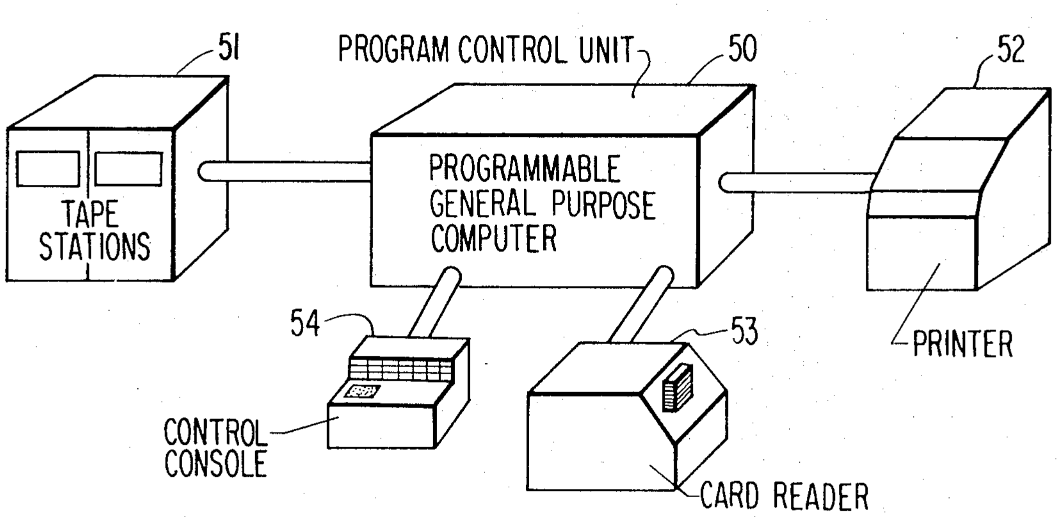
FIG. 3 is a block diagram of a general purpose programmable computer comprising the apparatus for performing the invention.

FIG. 3 illustrates the apparatus on which the method of the invention can be practiced. It is a block diagram of a computer system comprising a program control unit 50 to which are connected tape stations 51, a printer 52, a card reader 53, and a control console 54. A program based on the invention written in a computer language suitable for performance on the particular computer for which the program is written, is stored in a memory which may be an integral part of the program control unit 50. The program can be stored on a magnetic tape such as a program library tape and read into the program control unit 50 of the computer from tape stations 51. Alternatively, the program can be stored on punched cards and read into the computer program control unit 50 by card reader 53.

The initial data and parameters required during the execution of the program may be punched on cards and read from the card reader 53 or from the tape stations 51 as required during the execution of the program. Alternatively, the parameters might be generated by a preceding program and stored in specific locations in the memory within the process control unit 50.

As the various solutions are derived, results can be printed on the printer 52.

Figure 4:
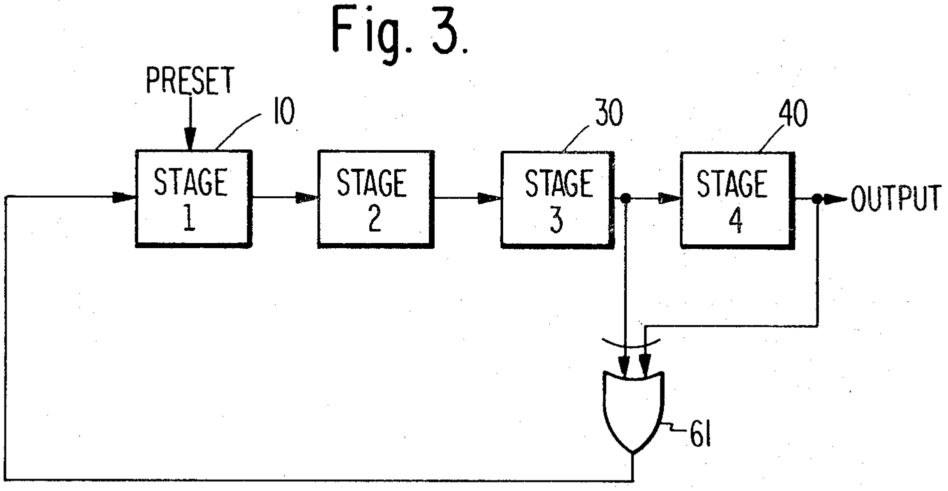
FIG. 4 is a logic diagram of a four-stage shift register generator providing a maximum length pulse sequence.

As an example of how this method derives a solution when one solution is known, consider the shift register generator shown in FIG. 4. It consists of four shift register stages and the contents of the first stage 10 is shifted into the second stage and so on by means not shown. The output of the generator is taken from the output of the fourth stage 40 and the input to the first stage 10 is the output of an EXCLUSIVE-OR gate 61. The input signals of the EXCLUSIVE-OR gate 61 are the output signals of the third stage 30 and the fourth stage 40.

Therefore, stage 1 will have an input when a signal representing a 1 is stored in stage 3 and a signal representing a 0 is stored in stage 4, or vice versa.

The first stage is set to the value of 1 by means of a preset signal so that the contents of the shift register before the first shift pulse occurs can be represented by 1000. After the first shift pulse, the contents of the register can be represented by 0100. A 0 is shifted into the first stage because stage 3–30 and stage 4–40 both contained a value of 0 before the shift. Table I shows the contents of the register after each of the first 16 shift pulses.

TABLE I

Shift Register Contents

| Shift Pulse Number | Contents of Stage 1 | 2 | 3 | 4 |
|---|---|---|---|---|
| 1 | 0 | 1 | 0 | 0 |
| 2 | 0 | 0 | 1 | 0 |
| 3 | 1 | 0 | 0 | 1 |
| 4 | 1 | 1 | 0 | 0 |
| 5 | 0 | 1 | 1 | 0 |
| 6 | 1 | 0 | 1 | 1 |
| 7 | 0 | 1 | 0 | 1 |
| 8 | 1 | 0 | 1 | 0 |
| 9 | 1 | 1 | 0 | 1 |
| 10 | 1 | 1 | 1 | 0 |
| 11 | 1 | 1 | 1 | 1 |
| 12 | 0 | 1 | 1 | 1 |
| 13 | 0 | 0 | 1 | 1 |
| 14 | 0 | 0 | 0 | 1 |
| 15 | 1 | 0 | 0 | 0 |
| 16 | 0 | 1 | 0 | 0 |

The contents of the shift register shown in FIG. 4 after the 16th shift are seen in table I to be the same as the contents after the first shift. Therefore, shift pulses 16 through 30 will repeat the sequence shown in table I from pulses 1 through 15.

The output of stage 4 is the output pulse sequence of the generator, 001001101011110, which will be repeated as long as the contents of the register are shifted.

It can be determined by means of Euler's phi function that there are two combinations of feedback taps for a four-stage shift register that will provide the maximum length pulse sequence. The second solution will now be derived from the known solution by the method of the invention.

The characteristic equation vector of the solution shown in FIG. 4 is 10011.

The first three rows of the B matrix are as follows:

01000

00100

00010

The next rows are found by shifting each value of the preceding row to the right so that the fourth row of the B matrix would be 00001. The last column, however, contains a 1 so it is necessary to add (modulo-2) the characteristic equation vector. Therefore, the fourth row of the B matrix is 10010.

The next row of the B matrix would be 01001, obtained by shifting the preceding row one column to the right and inserting a zero in the first column. The last column, however, contains a value of 1 so that it is necessary to add the characteristic equation vector. The fifth row is 11010.

The complete B matrix is 01000
00100
00010
10010
11010
11110
11100
01110
10100
01010
10110
11000
11000
01100
00110
10000

The next row of the B matrix will be the same as the first row and the matrix shown above would be repeated every 15 rows.

The C matrix is derived by taking every $k$-th row of the B matrix, where $k$ is a prime number other than 2 and also prime to $2^2-1$ (15). The smallest prime other than 2 also prime to 15 is 7. The C matrix is, therefore, 110
011
111
110 because the first and last columns of the rows from the B matrix are eliminated.

The C matrix is reduced first by adding (mod-2) the first column to the second column. The first step gives 100
011
101
100

The second step, adding (mod-2) the second column to the third column, yields 100
010
101
100

Finally, the third column is added (mod-2) to the first column to give the reduced C matrix 100
010
001
100

The last row has a value of 1 only in the first column. The one in the first column above the last row is in the first row so the solution vector is 100.

Figure 5:
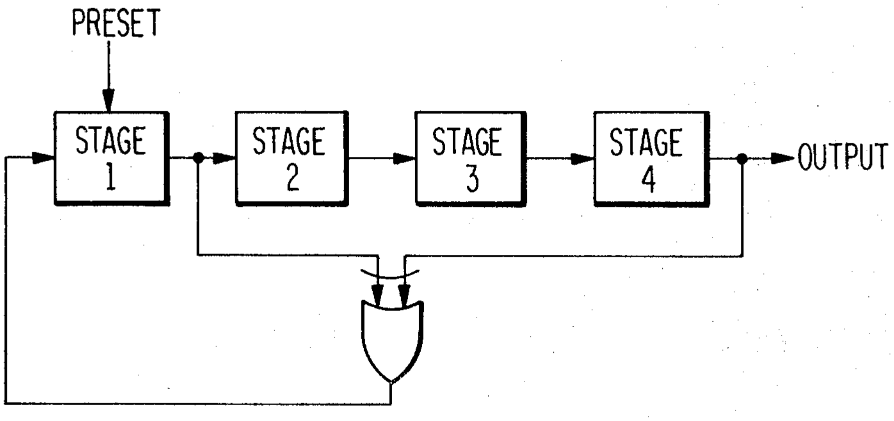
FIG. 5 is a logic diagram of another four-stage shift register generator providing a maximum length pulse sequence.

The shift register shown in FIG. 5 is the shift register generator that corresponds to the solution vector. There is a feedback tap from stage 1, corresponding to the one in the first column of the solution vector.

A new characteristic equation vector can be derived by adding a column containing a 1 at each end of the solution vector, viz, 11001

If this new characteristic equation vector is used to find another solution in the manner just described, the resulting solution will be 001 and the resulting characteristic equation, 10011. Because this is the same as

What is claimed is:

1. A machine implemented method for selecting which of the $n$ stages of a shift register generator should be summed modulo-2 (in addition to the last stage) to produce a feedback signal to the first stage of the shift register to produce an output pulse sequence of maximum length of $2^n-1$ bits when one such feedback combination of stages is known, comprising the steps of:

deriving a characteristic equation, a polynomial of degree $n-1$, the variable of which is the response matrix of the known feedback combination and the coefficients of whch are 1 or 0 depending on whether the stage represented by the exponent of the variable is summed or not, the zero power of the variable being an identity matrix with a coefficient of one;

generating a first matrix having $n$ columns and $2^n-1$ rows, the columns representing the exponents of a polynomial of degree $n-1$ and the rows representing successive powers of the response matrix of the known combination, the elements of which are 1 or 0 depending on whether the powers of the variable corresponding to the column number is summed or not to equal the power of the variable corresponding to the row number, where the characteristic equation is substituted for the $n$-th power of the variable where it appears;

generating a second matrix of $n$ rows and $n-1$ columns, the successive rows of which are every $k$ mod $(2^n-1)$-th row of the first matrix with the column corresponding to the zero power of the variable eliminated, where $k$ is an odd prime number that is also prime to $2^n-1$; the known solution, all the solutions have been found. This is also known because $$\frac{\phi(2^n-1)}{n}=\frac{\phi(15)}{4}=\frac{8}{4}=2$$

which is Euler's Function.

reducing the second matrix by adding modulo-2 one column to another so that each row except the last has only one element with a value of one and each such element in a differeent column for each row; and selecting as the feedback stages, in addition to the last stage, those stages corresponding to the row number having an element with a value of one in a column in which the last row has an element with a value of one.

2. A machine implemented method for finding which of $n$ stages in a shift register should be summed modulo-2 to the last stage to provide a feedback signal to the first stage of the shift register to generate an output from one stage of a maximum length sequence of $2^n-1$ bits when one such feedback combination of stages is known, comprising the steps of:

deriving a characteristic equation vector having elements $a_j$ such that $$a_j=\begin{cases}1 \text{ if the } j\text{th stage is summed}\\ 0 \text{ if the } j\text{th stage is not summed}\end{cases},\ j=1, 2, \ldots, n$$

and $a_0=1$;

generating a first matrix having $n+1$ columns and $2^n-1$ rows with elements $b_{i,j}$ such that for the first row $b_{i,j}=0$ except $b_{1,2}=1$ and the elements of each successive row are $$b_{i,j}=b_{i-1,j-1},\ i=1,2,\ldots,2^n-1 \text{ and } j=1,2,\ldots,n+1$$

and $$b_{i,j}=b_{i,j} \oplus a_j \text{ if } b_{i,n+1}=1,$$

and generating a second matrix having $n-1$ columns and $n$ rows, the elements $c_{i,j}$ of each successive row corresponding to the elements of every $k$ mod$(2^n-1)$-th row of the first matrix with the first and last columns deleted, where $k$ is an odd prime number that is also prime to $2^n-1$;

reducing the second matrix by adding columns together so that each row except the last has only one element having a value of one and each such element is in a different column;

deriving a solution vector having elements $s_i$ such that $s_i=0$ except $s_i=1$ if $c_{i,j}=1$ and $c_{n,j}=1$;

selecting as a feedback stage in addition to the last stage, the $i$-th stage where $s_i=1$.

UNITED STATES PATENT OFFICE
CERTIFICATE OF CORRECTION

Patent No. 3,614,400 Dated October 19, 1971

Inventor(s) Edward Charles Farnett & Lee Oliver Upton, Jr.

It is certified that error appears in the above-identified patent and that said Letters Patent are hereby corrected as shown below:

Col. 1, line 48, "$2^{n11}$" should be ---$2^{n-1}$---; line 56, "$2^{n1}1$" should be ---$2^{n-1}$---. Col. 2, line 18, "execpt" should be ---except---; line 57, "$a_{ij}$" should be ---$a_{i,j}$---; line 59, "$a_{ij} + b_{ij}$" should be ---$a_{i,j} + b_{i,j}$---. Col. 3, line 2, "column" should be ---columns---; line 23, "vlaue" should be ---value---; line 47, "mitrix" should be ---matrix---; line 54, "= j-1" should be ---i = j-1---; line 60, "foloows" should be ---follows---. Col. 4, line 20, "martix" should be ---matrix---; line 31, "martix" should be ---matrix---; line 56, "(except 21)" should be ---(except 2)---; line 61, "shwon" should be ---shown---. Col. 6, line 10, "martix" should be ---matrix---; line 12, "martix" should be ---matrix---; line 60, "later" should be ---latter---. Col. 7, line 21, "wirtten" should be ---written---; line 28 "equal to 1" should be ---equal to 0---; line 48, "indicies" should be ---indices---; line 53, "1.25x10" should be ---$1.25x10^{30}$---. Col. 9, line 41, delete ---11000---; line 49, "$2^2$-1" should be ---$2^n$-1---.

ORM PO-1050 (10-69)

USCOMM-DC 60376-P69
☆ U.S. GOVERNMENT PRINTING OFFICE : 1969 O—366-334

UNITED STATES PATENT OFFICE
CERTIFICATE OF CORRECTION

Patent No. 3,614,400 Dated October 19, 1971

Inventor(s) Edward Charles Farnett & Lee Oliver Upton, Jr.

It is certified that error appears in the above-identified patent and that said Letters Patent are hereby corrected as shown below:

Col. 10, after line 14 insert,

---the known solution, all the solutions have been found. This is also known because $$\frac{\phi(2^n-1)}{n} = \frac{\phi(15)}{4} = \frac{8}{4} = 2$$

which is Euler's Function.---

Col. 10, line 26, "whch" should be ---which---; lines 45-51, delete ---the known solution.....which is Euler's Function.---

Col. 11, line 1, "$b_{i,j}=b_{i11,j11}$, $i=1,2,\ldots,2^{n-1}$" should be ---$b_{i,j}=b_{i-1,j-1}$, $i=2,3,\ldots,2^n-1$---.

Signed and sealed this 2nd day of May 1972.

(SEAL)
Attest:

EDWARD M.FLETCHER,JR. ROBERT GOTTSCHALK
Attesting Officer Commissioner of Patents ORM PO-1050 (10-69)
USCOMM-DC 60376-P69
U.S. GOVERNMENT PRINTING OFFICE 1969 O—366-334